(12) United States Patent
Roos et al.

(10) Patent No.: US 8,727,050 B2
(45) Date of Patent: May 20, 2014

(54) SYSTEM AND METHOD FOR CONTROLLING AN ELECTRICALLY HEATED CATALYST FOR A HYBRID VEHICLE

(75) Inventors: Bryan Nathaniel Roos, Novi, MI (US);
Brian L. Spohn, Holly, MI (US);
Eugene V. Gonze, Pinckney, MI (US);
Halim G. Santoso, Novi, MI (US)

(73) Assignee: GM Global Technology Operations LLC

( * ) Notice: Subject to any disclaimer, the term of this patent is extended or adjusted under 35 U.S.C. 154(b) by 598 days.

(21) Appl. No.: 12/392,438

(22) Filed: Feb. 25, 2009

(65) Prior Publication Data

US 2010/0212981 A1    Aug. 26, 2010

(51) Int. Cl.
*B60K 20/00* (2006.01)
*B60K 13/04* (2006.01)
*B60K 1/00* (2006.01)

(52) U.S. Cl.
USPC ............... 180/65.275; 180/309; 180/65.1

(58) Field of Classification Search
USPC ........ 180/65.275, 309, 65.1; 292/2, 285, 268, 292/257
See application file for complete search history.

(56) References Cited

U.S. PATENT DOCUMENTS

| | | | |
|---|---|---|---|
| 3,577,164 A * | 5/1971 | Re Baratelli et al. | 290/38 C |
| 4,221,205 A * | 9/1980 | Koehler | 123/179.21 |
| 5,163,290 A | 11/1992 | Kinnear | |
| 5,234,668 A | 8/1993 | Harada et al. | |
| 5,257,501 A | 11/1993 | Wataya | |
| 5,345,761 A | 9/1994 | King et al. | |
| 5,465,573 A | 11/1995 | Abe et al. | |
| 5,537,321 A | 7/1996 | Yoshizaki et al. | |
| 5,566,774 A | 10/1996 | Yoshida | |
| 5,689,952 A | 11/1997 | Kato et al. | |
| 5,713,198 A | 2/1998 | Aoki et al. | |
| 5,785,137 A * | 7/1998 | Reuyl | 180/65.245 |
| 5,785,138 A | 7/1998 | Yoshida | |
| 5,791,140 A | 8/1998 | Shimasaki et al. | |
| 5,857,325 A | 1/1999 | Shimasaki et al. | |
| 5,950,419 A | 9/1999 | Nishimura et al. | |
| 5,966,931 A | 10/1999 | Yoshizaki et al. | |
| 6,057,605 A | 5/2000 | Bourne et al. | |
| 6,122,910 A | 9/2000 | Hoshi et al. | |
| 6,131,538 A | 10/2000 | Kanai | |
| 6,151,890 A | 11/2000 | Hoshi | |
| 6,167,696 B1 | 1/2001 | Maaseidvaag et al. | |

(Continued)

FOREIGN PATENT DOCUMENTS

| | | |
|---|---|---|
| DE | 4100133 A1 | 7/1992 |
| DE | 4231711 A1 | 4/1993 |

(Continued)

OTHER PUBLICATIONS

Office Action dated Mar. 30, 2012 from the German Patent Office for German Patent Application No. 10 2010 035 480.5; 6 pages.

*Primary Examiner* — Hau Phan
*Assistant Examiner* — Bryan Evans

(57) ABSTRACT

A system and control module for controlling an electrically heated catalyst includes a remote start module generating a remote start signal, a catalyst control module controlling the electrically heated catalyst based on the remote start signal and an engine control module starting the engine after preheating and/or when required by the vehicle to honor a request as defined in this document.

20 Claims, 3 Drawing Sheets

(56) References Cited

U.S. PATENT DOCUMENTS

| | | |
|---|---|---|
| 6,189,316 B1 | 2/2001 | Surnilla et al. |
| 6,244,043 B1 | 6/2001 | Farmer et al. |
| 6,324,835 B1 | 12/2001 | Surnilla et al. |
| 6,394,209 B1 | 5/2002 | Goehring et al. |
| 6,532,926 B1 * | 3/2003 | Kuroda et al. ............. 123/179.4 |
| 6,543,219 B1 | 4/2003 | Surnilla |
| 6,557,505 B1 | 5/2003 | Hori |
| 6,585,940 B2 | 7/2003 | Abe et al. |
| 6,651,422 B1 | 11/2003 | LeGare |
| 6,735,937 B2 | 5/2004 | Sumilla et al. |
| 6,799,421 B2 | 10/2004 | Surnilla |
| 6,820,471 B2 | 11/2004 | Ito |
| 6,853,895 B2 * | 2/2005 | Javaherian ..................... 701/36 |
| 7,077,224 B2 * | 7/2006 | Tomatsuri et al. ....... 180/65.235 |
| 7,213,665 B2 * | 5/2007 | Yamaguchi et al. ....... 180/65.27 |
| 7,363,915 B2 | 4/2008 | Surnilla et al. |
| 7,603,227 B2 | 10/2009 | Watanabe et al. |
| 7,707,821 B1 | 5/2010 | Legare |
| 7,792,627 B1 | 9/2010 | Santoso et al. |
| 7,829,048 B1 | 11/2010 | Gonze et al. |
| 7,934,487 B2 | 5/2011 | Santoso et al. |
| 8,209,970 B2 * | 7/2012 | Gonze et al. ..................... 60/303 |
| 8,359,844 B2 | 1/2013 | Gonze et al. |
| 8,413,423 B2 | 4/2013 | Roos et al. |
| 2003/0172643 A1 * | 9/2003 | Suzuki ........................... 60/284 |
| 2004/0045753 A1 | 3/2004 | Yamaguchi et al. |
| 2006/0278449 A1 | 12/2006 | Torre-Bueno |
| 2007/0186876 A1 | 8/2007 | Elwart et al. |
| 2008/0099259 A1 * | 5/2008 | Tomo ........................... 180/65.2 |
| 2008/0133114 A1 | 6/2008 | Okubo et al. |
| 2008/0282673 A1 | 11/2008 | Gonze et al. |
| 2010/0192122 A1 | 7/2010 | Esfahan et al. |
| 2010/0205939 A1 | 8/2010 | Sano et al. |
| 2011/0047980 A1 | 3/2011 | Santoso et al. |
| 2011/0078999 A1 | 4/2011 | Gonze et al. |

FOREIGN PATENT DOCUMENTS

| | | |
|---|---|---|
| DE | 60307939 T2 | 9/2007 |
| EP | 0935056 A2 | 8/1999 |
| JP | 09158715 | 6/1997 |
| JP | 2003227366 A * | 8/2003 |
| WO | WO-2007107135 A1 | 9/2007 |

* cited by examiner

SYSTEM AND METHOD FOR CONTROLLING AN ELECTRICALLY HEATED CATALYST FOR A HYBRID VEHICLE

FIELD

The present disclosure relates generally to emission controls for automotive vehicles and, more particularly, to a method and system for controlling an electrically heated catalyst for a hybrid vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine. Typically heated catalysts are used within the exhaust system to reduce certain components of the exhaust gases. Typically the heating comes from burning fuel in the engine. Electrically heated catalysts may also be used. The catalyst operates more efficiently above a certain temperature.

Hybrid vehicles generally have two power sources. The internal combustion engine is a first power source and an electric motor is a second power source. The electric motor is used more often as a power source in city driving where vehicle kinetic energy can be recovered by regenerative braking, converted to electric and chemical form, and stored in a battery, from which the motor is driven. The internal combustion engine is more suitable during highway driving, during which wheel braking and opportunities for energy recovery are infrequent, and the engine operates at its greatest efficiency.

In mixed driving conditions, the electric motor and combustion engine may be used together to transmit power to a transmission input shaft, depending on driving conditions and the magnitude of the battery capacity.

Hybrids experience long periods of engine off-time during idle and driving scenarios. During the period of engine off-time, the catalyst temperature may fall which may require additional heating to obtain the peak efficiency of the converter. Maintaining the catalyst temperature reduces the amount of emissions for a cold start event.

SUMMARY

The present disclosure provides a method and system for operating an electrically heated catalyst to maintain the catalyst temperature in a hybrid electric vehicle during cold engine starting events triggered by a remote start.

In one aspect of the disclosure, a method of operating a vehicle includes generating a remote start signal, in response to the remote start signal, initiating preheating an electrically heated catalyst and starting an engine after initiating preheating.

In another aspect of the disclosure, a control module for controlling an electrically heated catalyst includes a remote start module generating a remote start signal, a catalyst control module controlling the electrically heated catalyst based on the remote start signal and an engine control module starting the engine after preheating.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
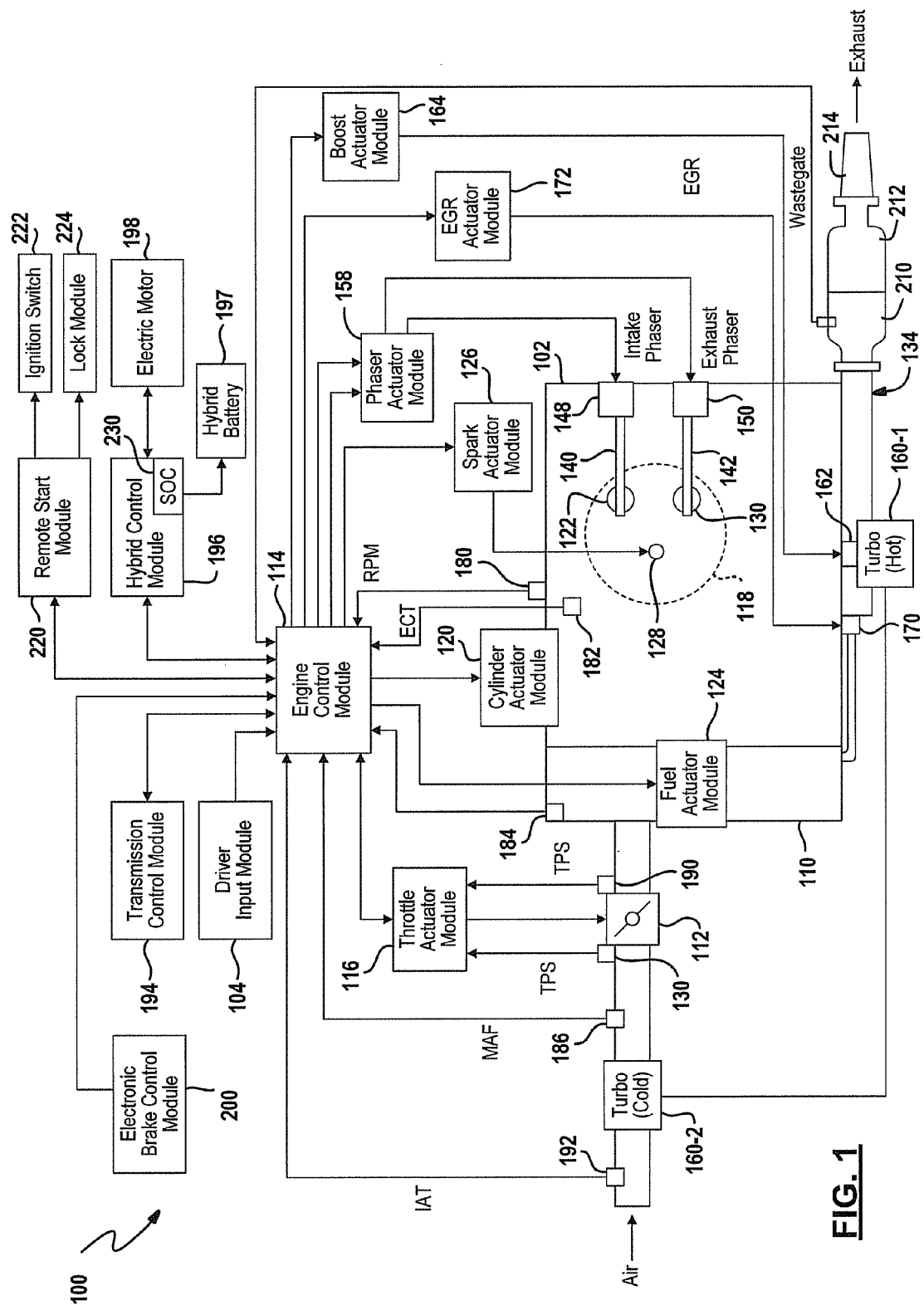
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110. The turbocharger 160 may also be a variable vane turbo.

A waste gate 162 may allow exhaust gas to bypass the turbocharger 160, thereby reducing the boost (the amount of intake air compression) of the turbocharger 160. The ECM 114 controls the turbocharger 160 via a boost actuator module 164. The boost actuator module 164 may modulate the boost of the turbocharger 160 by controlling the position of the waste gate 162. In various implementations, multiple turbochargers may be controlled by the boost actuator module 164.

The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198. The hybrid control module 196 may be in communication with a battery 197 for supplying electricity to the electric motor 198. The hybrid control module 196 may control for fuel economy or performance. The vehicle operator may be able to select the mode of operation.

The hybrid control module 196 may include a state-of-charge module 230 for determining the state-of-charge of the hybrid battery 197. The state-of-charge corresponds to the level of battery charge. A state-of-charge signal may be expressed as a percentage of full or an implementation of the same. There are different levels of the state-of-charge and thus a state-of-charge signal may correspond to a level of charge. The hybrid vehicle may operate in various modes of operation, including a charge depleting (CD) mode in which the vehicle operation uses the electric drive, engine subsystem, or both with a net decrease in the battery state-of-charge. A charge-sustaining (CS) hybrid electric vehicle mode is a mode in which vehicle operation on the electric drive is on the electric drive, engine subsystem, or both at a relatively constant battery state-of-charge. This is typically a narrow range.

The electric motor 198 may also function as a generator, and may be used to produce electrical energy for use by vehicle electrical systems, for storage in a battery, or both. In various implementations, various functions of the ECM 114, the transmission control module 194, and the hybrid control module 196 may be integrated into one or more modules.

An electronic brake control module 200 may also communicate with the engine control module 114. Various torques associated with the electronic braking system may be factored into the torque control as will be described below.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The ECM 114 may control actuator values in order to generate a desired torque from the engine 102.

The exhaust system 134 may include an electrically heated catalyst 210. The electrically heated catalyst 210 may be in communication with the engine control module 114 or other control modules such as the brake control module or a motor control module such as the hybrid control module 196. The engine control module 114 may control the connection and disconnection of the hybrid battery 197 to the electrically heated catalyst 210. Other modules may provide power directly to the electrically heated catalyst 210. A state-of-charge controller may also control the EHC 210. Of course, other modules may control the electrically heated catalyst 210. The electrically heated catalyst 210 may also be used in conjunction with a passive catalyst 212 that is heated by burning fuel. As is illustrated, the electrically heated catalyst 210 and the passive catalyst 212 are illustrated in a common housing. However, the two catalysts may be separate components within the exhaust system 134. The catalysts 210, 212 reduce noxious gases from the exhaust gases exiting a tailpipe 214.

A remote start module 220 may also be in communication with the engine control module 114. The remote start module 220 may receive a wireless signal such as an RF signal to remotely start the vehicle. Remote starting of a hybrid vehicle may include starting the engine to warm up the cabin or warm up other components, circulating cabin air with the heating system if the engine is already warm, and operating the electrically heated catalyst 210 in anticipation of operating the engine.

The remote start module 220 may be in communication with other vehicle components such as an ignition switch 222 and a lock module 224. The ignition switch 222 may have various positions such as an accessory position, and a run position. The ignition switch 222 may provide a signal corresponding to the run position, an accessory position and an off position. The lock module 224 may be in communication with the electric locks for the vehicle. When the vehicle is unlocked, an unlock signal may be generated and when the vehicle is locked, the lock module 224 may generate a locked signal.

Figure 2:
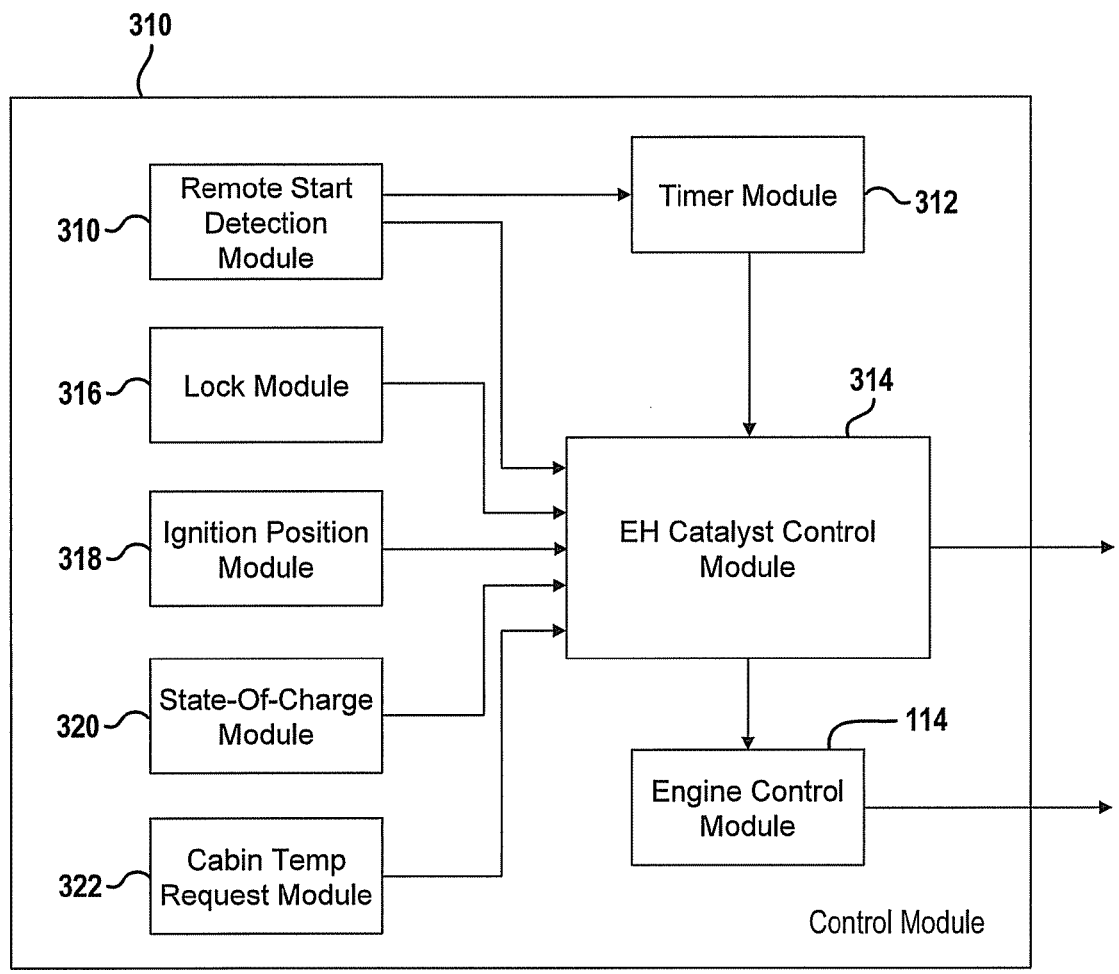
FIG. 2 is a block diagrammatic view of a control module according to the present disclosure.

Referring now to FIG. 2, a control module 300 is illustrated. The control module 300 is a generic control module that may include components of the engine control module 114, the transmission control module 194, the hybrid control module 196 and the remote start module 220. As mentioned above, the modules may be combined into one module or may be distributed into several distinct modules as is illustrated in FIG. 1.

The control module 300 includes a remote start detection module 310. The remote start detection module 310 may be coupled to a timer module 312. The timer module may time the elapsed time since the start module was activated. The remote start detection module 310 may generate a remote start signal and communicate the signal to an electrically heated catalyst control module 314. The time since the remote start signal was generated may be timed by the timer module 312.

A lock module 316 may communicate a door lock signal to the electrically heated catalyst control module 314. The lock module may generate a door unlock signal, a door lock signal, or a door lock activated signal, or a door unlock activated signal. An ignition position module 318 may generate an ignition position signal corresponding to the position of an ignition key. The ignition position module may generate a signal corresponding to the ignition on position, the ignition off position, or an accessory drive position.

A state-of-charge module 320 may communicate a state-of-charge to the electrically heated catalyst control module 314. The state-of-charge module may generate a state-of-charge for the hybrid battery 197.

A cabin temperature request module 322 may generate a cabin temperature request to the electrically heated catalyst control module 314. The cabin temperature request module 322 may be in communication with a climate control system within the vehicle. The cabin temperature request module may also be in communication with a key fob or other activator for the remote start system.

The electrically heated catalyst control module 314, based on the inputs from the other modules 310-322, may generate a control of the electrically heated catalyst so that the catalyst is activated prior to operation of the engine. The operation of the engine may be controlled by the engine control module 114. The engine control module 114 may also be used to activate a passive catalyst.

Figure 3:
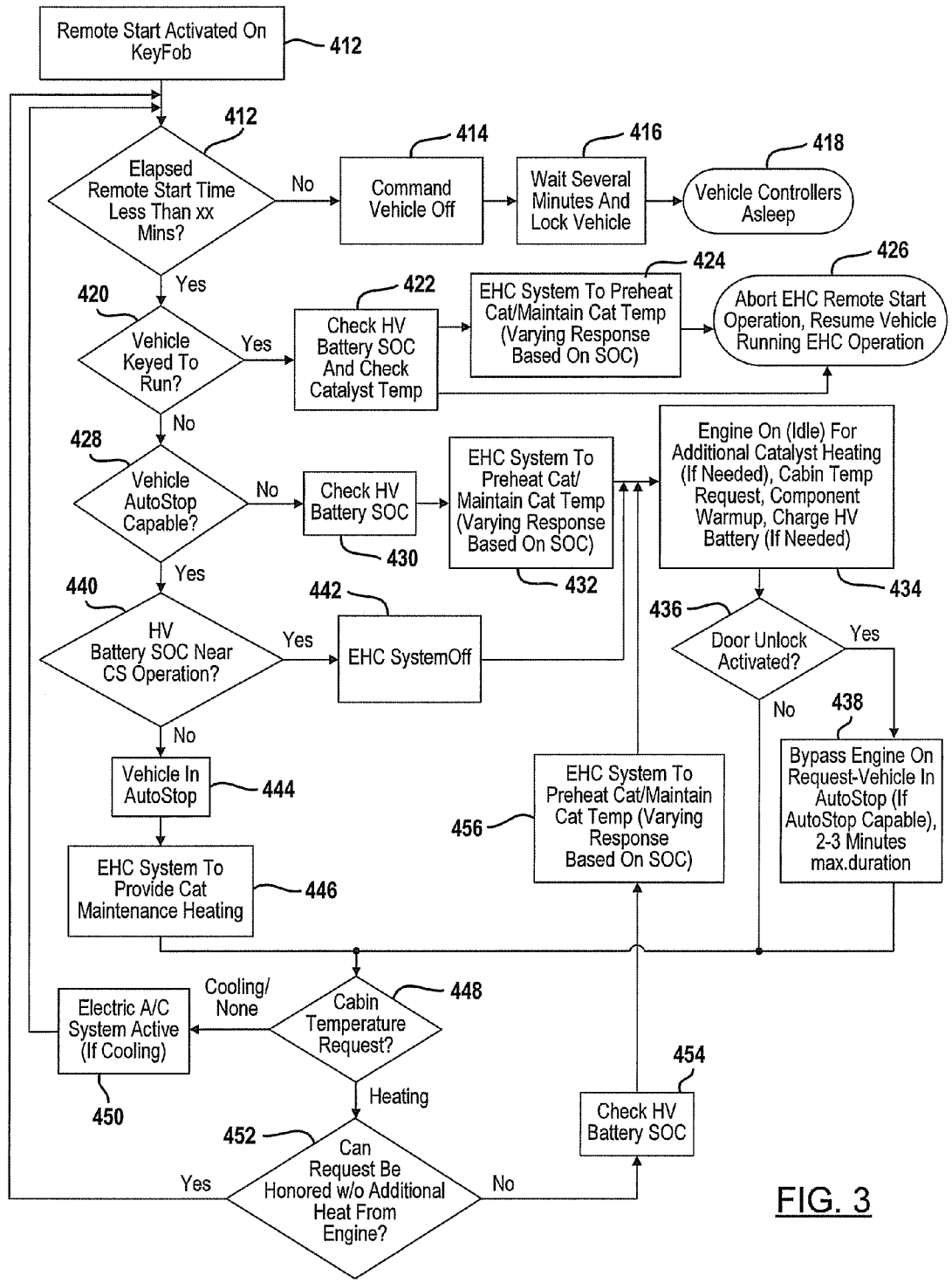
FIG. 3 is a flowchart of a method for starting a hybrid vehicle and controlling an electrically heated catalyst.

Referring now to FIG. 3, the present disclosure is specifically directed to a system for controlling an electrically heated catalyst in a hybrid vehicle upon remote starting. In step 410, a remote start may be activated on a key fob or other device. An RF signal may be received by a remote start module or other remote start detection. In step 412, if the remote start has not been activated for less than a predetermined amount of time, represented by the variable XX in step 412, step 414 commands the vehicle off or the remote start system off. In step 416, when the vehicle is unlocked, the vehicle may relock the door locks. This may be done centrally using an electric locking system. In step 418, the vehicle controllers that are typically activated during a remote start process may be put into a sleep mode. This may depower or reduce the power to such controllers.

Referring back to step 412, when the elapsed time is less than a predetermined threshold, step 420 is performed. In step 420, it is determined whether the vehicle has been keyed to run. To determine whether the vehicle has been keyed to run, the detection of a signal from an ignition source or key lock may be used. In a keyless system, pushing a button may be a keyed to run position. In step 422, if the vehicle has been keyed to run in step 420, step 422 checks the hybrid battery state-of-charge and the temperature of the catalyst to determine if fuel heating is required. If fuel heating is required, step 426 may be performed as described below. In step 424, the electrically heated catalyst system is energized to maintain a catalyst temperature or preheat to a catalyst temperature, or both. This step may be modified in response to a state-of-charge. After step 424, step 426 aborts the remote start operation initiated above in step 410 and resumes normal electrically heated catalyst operation in response to steps 420-424.

Referring back to step 420, when the vehicle is not keyed to run, step 428 determines whether the vehicle is autostop-capable. Autostop-capable refers to a hybrid vehicle being capable of operating without the vehicle engine in electric-only mode. If the vehicle is not capable of running in electric-only mode, step 430 checks the high voltage or hybrid battery state-of-charge. The electrically heated catalyst is preheated or maintained at a predetermined catalyst temperature. After step 432, step 434 starts the engine for additional catalyst heating if needed based upon a cabin temperature request, a component warm-up request, or if charging of the high voltage or hybrid battery is required. Thereafter, when the engine is on and the door unlock has been activated in step 436, the engine-on request is bypassed and the vehicle is placed into an autostop condition in step 438. The bypass step of 438 may be performed for a predetermined time such as two-three minutes. By performing step 438 the customer will not hear the engine running when entering or approaching the vehicle. A key entry to the vehicle or the use of the remote key fob may allow the vehicle to perform an autostop.

Referring back to step 428, when the vehicle is capable of an autostop, step 440 is performed. In step 440, the hybrid battery state-of-charge is monitored. When the state-of-charge of the hybrid battery is near charge-sustaining (CS) operation, the electrically heated catalyst system is turned off in step 442. Thereafter, steps 434-436 may be performed with the engine on.

Referring back to step 440, when the hybrid battery state-of-charge is not near charge-sustaining operation and the vehicle is in autostop in step 444, step 446 provides catalyst maintenance heating.

After steps 436 wherein the door lock is not activated and after steps 438 and 446, step 448 is performed. Step 448 determines whether or not a temperature request is generated. After step 448, when a cooling request is generated, step 450 activates an electric air-conditioning system. After step 450, step 412 is again performed.

Referring back to step 448, when the cabin temperature request is a heating request, step 452 determines whether the heating request can be honored without additional heat from the engine. If additional heat does not need to be provided, step 412 is again performed. If additional heat from the engine is required, the battery state-of-charge is determined in step 454. Thereafter, step 456 electrically heats the catalyst to a preheat temperature or maintains the catalyst temperature. Thereafter, the engine is turned on and steps 434-438 are again performed.

Hybrid customers typically expect their vehicles to operate in electric-only mode as often as possible. The catalyst in a charge depleting hybrid is maintained in anticipation for an engine on event in the case when a customer enters the vehicle and drives away with a high torque request. The vehicle must also honor all cabin comfort requests such as heating and air-conditioning during remote starts in a manner that minimizes fuel usage and emission output. The above method provides an electrically heated catalyst system that reduces fuel consumption and reduces emission output during remote start events.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of operating a vehicle comprising:
generating a remote start signal;
in response to the remote start signal, initiating preheating of an electrically heated catalyst; and
starting an engine independent of a state-of-charge of a battery in response to a catalyst temperature being less than a predetermined temperature when an ignition is in an off position after initiating preheating.

2. A method as recited in claim 1 further comprising after a predetermined time after generating a remote start signal, generating a remote start off signal.

3. A method as recited in claim 1 further comprising when the ignition is in a run position, determining the state-of-charge of a battery.

4. A method as recited in claim 3 wherein initiating comprises initiating preheating based on the state-of-charge.

5. A method as recited in claim 1 further comprising when the vehicle is not autostop-capable, determining the state-of-charge of a battery and electrically controlling the catalyst in response to the state-of-charge and wherein starting an engine comprises starting the engine for at least one of additional catalyst heating, a cabin temperature request and a component warm-up.

6. A method as recited in claim 5 further comprising when a door unlock signal is generated, turning off the engine.

7. A method as recited in claim 5 further comprising when a door unlock signal is generated, turning off the engine when the vehicle is autostop-capable and the state-of-charge is not in or near a charge-sustaining mode.

8. A method as recited in claim 1 wherein when the vehicle is autostop-capable, and the state-of-charge of a battery is near charge-sustaining operation, deactivating the electrically heated catalyst and, thereafter, starting the engine.

9. A method as recited in claim 1 wherein when the vehicle is in autostop mode and the state-of-charge of a battery is not near charge-sustaining operation, electrically maintaining the heated catalyst.

10. A method as recited in claim 9 wherein when a cabin temperature request cannot be met, heating the catalyst electrically until starting the engine.

11. A method as recited in claim 1 wherein initiating preheating comprises initiating preheating from a hybrid battery.

12. A control module for controlling an electrically heated catalyst comprising:
a remote start module that generates a remote start signal;
a catalyst control module that initiates preheating of the electrically heated catalyst based on the remote start signal; and
an engine control module that starts an engine independent of a state-of-charge of a battery in response to a catalyst temperature being less than a predetermined temperature when an ignition is in an off position after preheating of the electrically heated catalyst is initiated.

13. A system comprising:
an electrically heated catalyst; and
a control module as recited in claim 12.

14. A hybrid vehicle comprising:
the system as recited in claim 13; and
a hybrid battery in communication with the electrically heated catalyst.

15. A control module as recited in claim 12 further comprising a state-of-charge module that determines the state-of-charge of the battery.

16. A control module as recited in claim 15 wherein the engine control module starts the engine when the state-of-charge is near a charge-sustaining mode.

17. A control module as recited in claim 15 wherein the engine control module starts the engine based on the state-of-charge and a cabin temperature request.

18. A control module as recited in claim 15 wherein the engine control module starts the engine when a vehicle is not autostop-capable.

19. A control module as recited in claim 18 further comprising a door lock module that generates a door unlock signal and turns off the engine in response to the door unlock signal.

20. A control module as recited in claim 12 further comprising a hybrid battery in communication with the electrically heated catalyst.

\* \* \* \* \*